Figure 1:
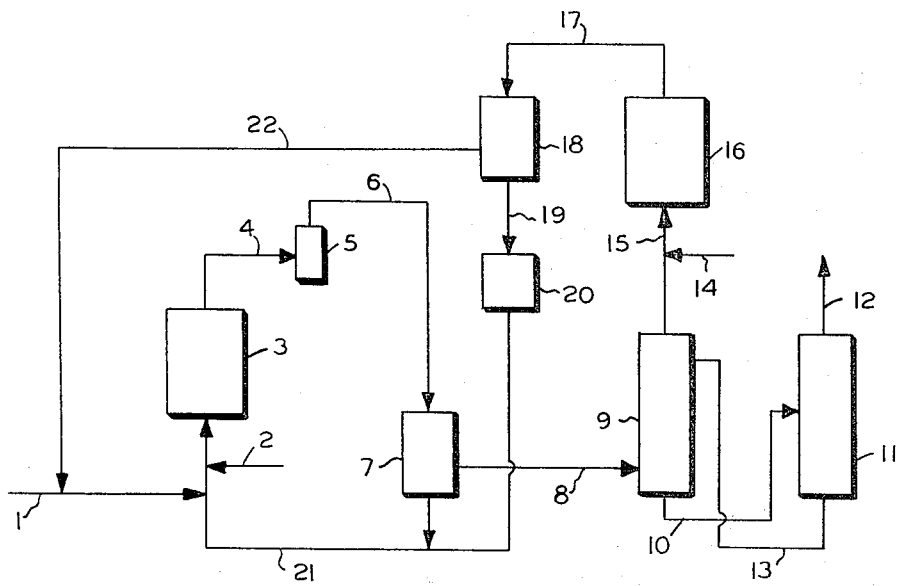

Dec. 13, 1966     EIJI OTSUKA ETAL     3,291,846
PROCESS FOR PRODUCING VINYL CHLORIDE
Filed Sept. 4, 1963

INVENTORS
EIJI OTSUKA
TŌRU TAKAHASHI
TAKESHI ABE

BY *Fisher, Christen, Sabol & Caldwell*
ATTORNEYS

United States Patent Office 3,291,846
Patented Dec. 13, 1966

3,291,846
PROCESS FOR PRODUCING VINYL CHLORIDE
Eiji Otsuka and Toru Takahashi, Kugenuma Fujisawa, and Takeshi Abe, Zushi, Japan, assignors to Toyo Koatsu Industries, Incorporated, Chuo-ku, Tokyo, Japan, a corporation of Japan
Filed Sept. 4, 1963, Ser. No. 306,419
Claims priority, application Japan, Sept. 22, 1962, 37/40,925
7 Claims. (Cl. 260—656)

This invention relates to an improvement in a process for producing vinyl chloride from ethylene, chlorine and oxygen.

In producing vinyl chloride from ethylene and chlorine, there are already known processes wherein ethylene dichloride is synthesized from ethylene and chlorine, vinyl chloride and hydrogen chloride are synthesized by thermodecomposing this ethylene dichloride, and vinyl chloride is synthesized by making this by-produced hydrogen chloride react with acetylene, or ethylene and oxygen are added to this by-produced hydrogen chloride, to synthesize ethylene dichloride, and this ethylene dichloride is thermodecomposed into vinyl chloride and hydrogen chloride (B. Patent 603,809), and a process wherein vinyl chloride is synthesized from ethylene, chlorine and oxygen in one step in the presence of a copper oxide catalyst in the same reaction tube (U.S. Patent 2,327,174).

However, in the former, both ethylene and acetylene are used as raw materials in producing vinyl chloride and both material gases are not obtained in the same factory. So in the above case there is a disadvantage that ethylene dichloride must be carried to an acetylene factory and thermodecomposed there into vinyl chloride and hydrogen chloride and the by-produced hydrogen chloride must be made to react with acetylene so as to be made vinyl chloride. In the latter process, it is impossible to convert substantially all of the fed chlorine into vinyl chloride in one step. In the case of obtaining vinyl chloride as a main product, a considerably large amount of unreacting hydrogen chloride remains. Further, when the rate of conversion of hydrogen chloride is made high by causing the reaction at a low temperature, the amount of by-production of ethylene dichloride naturally increases and its decomposition will be a problem. Furthermore, in the above case, dichloroethylene, trichloroethylene and tetrachloroethylene are by-produced so much that the separation and refinement of the reaction product is much complicated. Further, if ethylene, chlorine and oxygen are made to react at about 400° C. by using a copper oxide catalyst, the catalyst deteriorates so fast that the industrial practice of such reaction is considered to be impossible.

On the other hand, according to the present invention vinyl chloride is produced from ethylene, chlorine and oxygen by the process comprising the steps (1) reacting ethylene with chlorine at a high temperature in a first reaction zone to form a product containing vinyl chloride, hydrogen chloride and unreacted ethylene; (2) absorbing vinyl chloride from said product with a solvent solution in an absorbing zone; (3) mixing oxygen and ethylene to the outlet gas of the absorbing zone containing hydrogen chloride and unreacted ethylene; (4) subjecting a gaseous mixture of the Step 3 to a catalytic oxychlorination to form a product containing ethylene dichloride, vinyl chloride, water and unreacted ethylene in a second reaction zone, and (5) circulating said product to the first reaction zone as it is or cooling said product for a condensation to separate liquid ethylene dichloride and water from gaseous vinyl chloride and ethylene, separating the water from ethylene dichloride and circulating the ethylene dichloride to the first reaction zone directly whereby ethylene dichloride is decomposed into vinyl chloride simultaneously a production of vinyl chloride from ethylene and chlorine.

Therefore, in the process of the present invention, except that a small part of the chlorine being used is consumed for polychlorinated compounds, all the amount of the chlorine is utilized for vinyl chloride. In such case, for the hydrocarbon source is used ethylene only. After all, vinyl chloride is obtained from ethylene, chlorine and oxygen.

An object of this invention is to provide novel process for producing vinyl chloride from ethylene, chlorine and oxygen.

Another object is to improve the reaction of ethylene and chlorine.

A further object is to provide excellent catalysts and reaction conditions for the reaction of ethylene, hydrogen chloride and oxygen.

The present invention is characterized by that; in producing vinyl chloride by causing ethylene and chlorine to react with each other at a high temperature, oxygen is added to the produced gas mixture, which is obtained by the reaction of ethylene and chlorine and is contained unreacted ethylene and by-produced hydrogen chloride, to produce ethylene dichloride and vinyl chloride, then the obtained ethylene dichloride and vinyl chloride as they are or after having the ethylene dichloride separated are fed to the reaction zone for making ethylene and chlorine react with each other whereby ethylene dichloride decomposed into vinyl chloride in the same reaction zone simultaneously with a production of vinyl chloride from ethylene and chlorine. Finally, vinyl chloride is obtained by using only ethylene as a hydrocarbon source.

As in the process of the present invention, ethylene dichloride produced by oxychlorination by using as raw materials unreacted ethylene and hydrogen chloride by-produced by the reaction of ethylene and chlorine is decomposed by utilizing the reaction heat of ethylene and chlorine, there are advantages that the heat energy is effectively utilized and that the rate of decomposition of ethylene dichloride into vinyl chloride per passage can be elevated to 70 to 95% whereas the rate of decomposition is 50 to 60% in case ethylene dichloride is decomposed alone. As a result, it can improve such basic units as heat, electric power and steam and to reduce the construction cost and cheap vinyl chloride can be produced by using as raw materials ethylene, chlorine and oxygen only.

The substance of the present invention shall be explained in detail in the following.

According to the present invention, ethylene and chlorine are added to a gaseous mixture of ethylene, vinyl chloride and ethylene dichloride in the first reaction tube to produce a vinyl chloride and hydrogen chloride by the reaction of ethylene and chlorine with each other and simultaneously to decompose ethylene dichloride into vinyl chloride and hydrogen chloride. Then the reaction gaseous mixture containing vinyl chloride, hydrogen chloride, unreacted ethylene and other ethylene chlorine compounds is cooled to a normal temperature, dried, the vinyl chloride and other ethylene chlorine compounds are absorbed in such absorbent as ethylene dichloride and removed. Oxygen or an oxygen-containing gas and lacking ethylene to the reaction of ethylene, hydrogen chloride and oxygen are added to the mixture gas containing hydrogen chloride and ethylene, the resulting gaseous mixture is introduced into the second reaction tube to produce ethylene dichloride and vinyl chloride by a catalytic oxychlorination, the outlet gas of the second reaction tube containing ethylene dichloride, vinyl chloride and unreacted ethylene is directly put into the first reaction tube and chlorine is added thereto to produce vinyl chloride and simultaneously to decompose ethylene dichloride with its reaction heat.

Or the outlet gas of the second reaction tube is cooled to a temperature less than 30° C. for a condensation to separate liquid ethylene dichloride and water from gaseous vinyl chloride and unreacted ethylene, the ethylene dichloride is separated from water layer and then put into the first reaction tube to decompose into vinyl chloride, on the other hand, gaseous vinyl chloride and unreacted ethylene are absorbed with a solvent solution such as ethylene dichloride or is cooled to a temperature less than −10° C. for a condensation to separate vinyl chloride from ethylene and then ethylene is circulated to the first reaction tube or the second reaction tube.

In the present invention, when the reaction temperature of the first reaction tube becomes less than 400° C., the reaction of ethylene and chlorine tends to produce rather ethylene dichloride than vinyl chloride, ethylene dichloride circulated from the second reaction tube also remains undecomposed, the production of ethylene dichloride after all increases and therefore it is unfavourable to produce vinyl chloride. Therefore, it is good to keep the temperature of the first reaction tube above 400° C. or most preferably at 450 to 550° C. In case this temperature range is exceeded, the deposition of carbon and production of a tarry substance are so much as to be undesirable.

When the temperature of the first reaction tube is kept at 450 to 550° C. and the ethylene dichloride circulated from the second reaction tube is fed as it is or as preheated to 300 to 500° C. in case it is once cooled, it can be decomposed into vinyl chloride by the reaction heat of producing vinyl chloride from ethylene and chlorine without being heated at all from outside. The reaction heat generated at the time of producing vinyl chloride directly from ethylene and chlorine is such considerable heat as about 27 kcal./mol. In the case of making only ethylene and chlorine react with each other, if ethylene and chlorine are made to react adiabatically by being fed so that the mol ratio of ethylene to chlorine may be 2.0–4.5:1, the temperature of the first reaction tube can be easily kept at 450 to 550° C.

In the case of decomposing ethylene dichloride in the first reaction tube for making ethylene and chlorine react with each other as in the present invention, since the decomposing reaction of ethylene dichloride is endothermic, the lacking heat is needed. In case the outlet gas of the second reaction tube is once cooled, it is good to preheat ethylene and ethylene dichloride circulated from the second reaction tube. If ethylene and ethylene dichloride are preheated to 300 to 500° C., it is not necessary to heat the reaction tube and it can easily decompose the fed ethylene dichloride into vinyl chloride with the heat of the reaction of ethylene and chlorine. Further, in case the outlet gas of the second reaction tube is fed as it is to the first reaction tube, its sensible heat is utilized and therefore the ethylene dichloride in the outlet gas can easily decompose into vinyl chloride without preheating from outside. In such case, under the catalytic action of free chlorine, ethylene dichloride is easily decomposed into vinyl chloride. Thus it is one of the greatest advantages of the present invention that such high rate of decomposition as 70 to 95% per passage is easily reached as compared with the rate of 50 to 60% in the case of decomposing pure ethylene dichloride singly. For example, when the temperature of the first reaction tube was kept at 480 to 510° C., the rate of decomposition reached 70 and 85%, respectively. Further, when ethylene and chlorine are made to react with each other at such a high temperature, an undesirable decomposing reaction of finally producing carbon and hydrogen chloride from ethylene and chlorine occurs as an auxiliary reaction. However, in case ethylene dichloride is added thereto and is decomposed simultaneously, said undesirable decomposing reaction does not become severe because of the addition of ethylene dichloride but tends to be rather inhibited. For example, in case only ethylene and chlorine were made to react at a mol ratio of ethylene to chlorine of 4:1 and a reaction temperature of 500° C., the amount of chlorine consumed in the above mentioned decomposing reaction was about 15% of the amount of fed chlorine, whereas, when the reaction was caused by adding ethylene dichloride thereto at a mol ratio of ethylene to chlorine to ethylene dichloride of 4:1:1.5 and a reaction temperature of 500° C., the amount of the chlorine consumed in the decomposing reaction was 5 to 8%.

A fluid heat carrier particle with a reaction gas itself is used in the first reaction tube. When ethylene, chlorine and ethylene dichloride are made to react with one another by using a fluid bed, there is advantages that the reaction temperature can be very easily kept constant and that the reaction tube is not clogged with carbon deposited with the progress of the reaction. That is to say, there are problems that, in case the reaction is caused by using an empty tube, it is difficult to keep the reaction temperature constant by preheating and cooling operations and that, in case a fixed bed containing such bulking agent as a catalyst is used, the reaction tube is clogged with deposited carbon in a short time. On the other hand, in case a fluid bed is used, it becomes possible to keep the reaction temperature constant and to complete the reaction within a short contact time and, further, as the heat carrier particle with which the chamber is charged are always kept in a moving state, there is no danger of clogging, the produced carbon is continuously discharged out of the reaction chamber and is separated from the reaction produced gas by using, for example, a cyclone or the like. It is therefore possible to continuously and smoothly advance the reaction. The solid particle to be used for the fluid bed acts as a mere heat carrier and therefore is of such inert substance as sand, silicon carbide, glass powder, pumice stone or fire brick. However, such adsorbent as, for example, active carbon, silica gel or alumina gel is used.

The contact time in the fluid bed can be varied in the wide range of 0.05 to 0.5 second. The reaction is completed in a very short time. If the gas is made to stay for an unnecessarily long time, such undesirable reactions as the deposition of carbon and the production of tar become severe.

The composition of the gas fed to the first reaction tube is different depending on the conditions of operation of the first and second reaction tubes but can be adjusted the mol ratio of ethylene to chlorine to ethylene dichloride in the range of 3–5:1:0.2–2.0. The amount of addition of ethylene dichloride is determined by the rate of decomposition per passage in the first reaction tube and the amount of production of ethylene dichloride in the second reaction tube. Ethylene is used in excess of the theoretical amount. It is preferable to feed 3 mols or more of ethylene per mol of chlorine. When the rate of excess of ethylene is lower than that, the amount of by-production of such unnecessary polychlorinated compounds as, for example, trichloroethane, tetrachloroethane and dichloroethylene increase. Therefore, it is not desirable.

Further, the first reaction tube is operated under a pressure for the convenience of the absorption and separation of the reaction produced gas. However, the reaction pressure is kept usually in the range of the normal pressure to 10 atmospheres.

The gas coming out of the first reaction tube is refined and cooled to normal temperature and then has vinyl chloride, ethylene dichloride and other ethylene chlorine compounds absorbed and removed with such solvent as ethylene dichloride in a vinyl chloride absorbing tower. Unreacted ethylene and by-produced hydrogen chloride are taken out of the tower top. It is proper that the temperature of the vinyl chloride absorbing tower is 10 to −10° C. and that the pressure of the tower is the normal pressure to 15 atmospheres. The mixture gas of ethylene and hydrogen chloride coming out of the vinyl chloride absorbing tower has oxygen or an oxygen containing gas and lacking ethylene added thereto and is then sent to the second reaction tube to produce vinyl chloride and ethylene dichloride by a catalytic oxychlorination.

In the second reaction tube, the production ratio of vinyl chloride to ethylene dichloride by the catalytic oxychlorination can be varied by varying the mol ratio of ethylene to hydrogen chloride to oxygen, the reaction temperature and the catalyst composition. The reaction of ethylene, hydrogen chloride and oxygen is a considerable exothermic reaction. In the case of keeping the reaction temperature in an adiabatic reaction, the reaction temperature is determined by the mol ratio of ethylene to hydrogen chloride to oxygen. For example, in the case that ethylene to hydrogen chloride to oxygen is 5:1:0.3, the reaction temperature when the heat loss is neglected is about 380° C.

The preferable reaction temperature is 350–480° C. The desired reaction temperature is determined by the desired reaction product composition. Therefore, the preferable gas composition in the inlet of the second reaction tube is in the range of a mol ratio of ethylene to hydrogen chloride to oxygen of 1.5–6.0:1.0:0.2–0.5. For example, in case the amount of ethylene is less than the amount in this range, the amount of production of the polychlorinated compounds increases and is not preferable. The reaction pressure can be varied in the range of the normal pressure to 10 atmospheres.

The reaction in the second reaction tube is carried out by a fixed bed system or a fluid bed system by using a catalyst effective to the oxidization of hydrochloric acid. As described above, the reaction of ethylene, hydrogen chloride and oxygen with one another generates such considerable heat that, from the viewpoint of the control of the reaction temperature, it is desirable to apply a fluid bed. The reaction temperature is controlled by adjusting the amount of addition of excess ethylene. However, if a too large excess of ethylene is used, it is difficult to separate the object product from the reaction produced gas. Therefore, in case it is not desirable to elevate the rate of excess of ethylene, the rate can be reduced by such means as externally cooling the reaction tube or pouring water into the reaction tube.

The catalyst to be used in the second reaction tube can be of a type used in the Deacon process for synthesizing chlorine by the reaction of hydrochloric acid and oxygen with each other and is such chloride or oxychloride as of Cu, Ni, Co, Fe, Cr, Al or Zn. For the promoter is used a chloride of any of alkali metals, Th, Ce, Sn, Bi, Pb and Ag. The especially preferable promoter can vary depending on the object product but may be of such composition in which the catalyst component remains molten in the reaction state. It is said that the effective combination of the catalyst component are $CuCl_2$-$KCl$ and $FeCl_3$-$AlCl_3$.

It has been found that a catalyst which is added a promoter selected from the group $ThCl_4$ and $SnCl_2$ to a $CuCl_2$-$KCl$ catalyst is very effective in the oxychlorination.

In this oxychlorination it may be already known that $CuCl_2$-$KCl$ is used as effective catalyst, but is not known to add $SnCl_2$ or $ThCl_4$ to said catalyst as a promoter. In this way these promoters can unsuspectedly elongate a life of said catalyst. For example, when the inlet gaseous mixture of the second reaction tube is subjected to an oxychlorination on a $CuCl_2$-$KCl$-$SnCl_2$ or $CuCl_2$-$KCl$-$ThCl_4$ catalyst, the activity of said catalyst can be kept for 200 hours in the condition of the present invention whereas a $CuCl_2$-$KCl$ catalyst can be kept only 20 hours.

Further in case it is desired to increase the rate of production of vinyl chloride, a $CuCl_2$-$KCl$-$SnCl_2$ catalyst is effective and, in case ethylene dichloride is to be increased, a $CuCl_2$-$KCl$-$ThCl_4$ catalyst is preferable. The rate of composition of such catalyst components can be varied in a wide range. However, in order to keep a molten state at a reaction temperature of 350 to 480° C., a mol ratio of $CuCl_2$ to $KCl$ of 2–0.5:1 is preferable. Such promoter as, $SnCl_2$ or $ThCl_4$ in a range of 0.1–0.5 mol to $CuCl_2$ shows a sufficient activity. When such promoter is selected, the rate of yield of the object product increases, the rates of production of vinyl chloride and ethylene dichloride can be properly varied and it is possible to elongate the life of the catalyst. When a catalyst of $CuCl_2$ to $KCl$ to $ThCl_4$ of 3:2:0.5 is used, the mol ratio of the raw material gas of $C_2H_4$ to $HCl$ to $O_2$ is 3:2:0.7 and the reaction temperatures are 388 and 428° C., the rates of conversion to the respective products on the basis of HCl are 2.0 and 11.0% vinyl chloride, 95.0 and 84.0% ethylene dichloride, 0.2 and 0.3% 1,2-dichloroethylene and 1.0 and 1.5% unreacted hydrogen chloride, respectively. When a catalyst of $CuCl_2$-$KCl$-$SnCl_2$ is used, the composition of the raw material gas of $C_2H_4$:$HCl$:$O_2$ is 3:2:0.5 to 1.0 and the reaction temperatures are 467 and 450° C., the rates of conversion to the respective products on the basis of HCl are 33.0 and 26.0% vinyl chloride, 36.0 and 49.5% ethylene dichloride, 0.2 and 0.2% 1,2-dichloroethylene and 25.0 and 18.0% unreacted hydrogen chloride, respectively, and the amount of production of vinyl chloride can be greatly increased.

As the outlet gas of the second reaction tube is composed of ethylene dichloride, vinyl chloride, water and unreacted ethylene, ethylene dichloride and water are condensed by cooling to a temperature less than 30° C. and whereby are separated from a gaseous mixture containing vinyl chloride and ethylene. The ethylene dichloride separated from water layer is fed to the first reaction tube and is thermodecomposed into vinyl chloride and hydrogen chloride. The vinyl chloride in the gaseous mixture is separated from gaseous ethylene by absorbing with a solvent solution such as ethylene dichloride or by cooling to a temperature less than −10° C. and refined to be a product. If vinyl chloride which is produced in the second reaction tube is small, it is able to be abridged the step to separate ethylene from vinyl chloride. The remaining ethylene is either circulated to the first reaction tube or to the second reaction tube and is used to produce vinyl chloride and ethylene dichloride. Also when only ethylene dichloride is produced in the second reaction tube, the ethylene dichloride is cooled and separated from water layer and is thermodecomposed in the first reaction tube. In a process for effectively utilizing the heat of the outlet gas of the second reaction tube, said outlet gas is put into the first reaction tube as it is without being cooled and ethylene dichloride is decomposed into vinyl chloride in the reaction tube.

From the above, it is found that the present invention is an excellent vinyl chloride producing process having the following advantages:

(1) It is possible to produce vinyl chloride and ethylene dichloride from ethylene, chlorine and oxygen only. It is not necessary to produce acetylene for the utilizing of by-produced hydrogen chloride.

(2) In the conventional process, the total amount of ethylene and chlorine is made ethylene dichloride, this is decomposed with external heat in a thermodecomposing apparatus into vinyl chloride and hydrochloric acid and this by-produced hydrochloric acid is made to react with ethylene and oxygen so as to be ethylene dichloride. On the other hand, in the present invention, vinyl chloride and hydrochloric acid are synthesized in one step in the first reaction tube, resulting hydrogen chloride synthesizes vinyl chloride and ethylene dichloride by additions of ethylene and oxygen, the ethylene dichloride can be decomposed into vinyl chloride with the reaction heat of ethylene and chlorine in the first reaction tube, therefore such basic units as heat, electric power and steam are very favourable, the construction cost is low and vinyl chloride can be produced very cheaply.

(3) In a process for producing vinyl chloride in one step from ethylene, chlorine and oxygen, it is necessary to make the reaction temperature so high as to be about 480 to 600° C. At such high temperature, the amount of unreacted hydrogen chloride is so large, the ethylene itself is oxidized by oxygen, the production of carbon dioxide and carbon monoxide increase and the basic units of ethylene is made unfavourable. On the other hand, in the process of the present invention, the temperature of the second reaction tube for adding oxygen can be made lower than the temperature of the first reaction tube and therefore the rate of decomposition of ethylene can be reduced to be as low as possible.

(4) In the present invention, by dividing the reaction tube into two steps, such reaction types and catalysts as are adapted to the respective reactions can be used and, by keeping the respective steps under optimum conditions, it is possible to completely utilize fed chlorine without producing by-produced hydrogen chloride. Further, by carrying out oxychlorination at a low temperature, any catalyst of such type comparatively likely to lose its activity against heat as is used in the Deacon process can be utilized.

Thus, we believe that, as compared with the process for producing vinyl chloride in one step from ethylene, chlorine and oxygen in the same reaction tube and the process for producing vinyl chloride by synthesizing ethylene dichloride from ethylene and chlorine in a petroleum chemical center and decomposing ethylene dichloride into vinyl chloride and by-produced hydrogen chloride and making the by-produced hydrochloric acid react with acetylene in an acetylene factory, the present invention is much lower in the construction cost and various basic units, is an ideal vinyl chloride producing process and is an industrially important invention.

The invention is illustrated in following example by the accompanying drawings wherein a diagrammatic flow sheet suitable for carrying out the present invention is shown.

EXAMPLE 1

In FIGURE 1, 20.5 kg. of ethylene through the pipe 1 (including ethylene circulated from the second reaction tube 16 through the pipe 22), and a total of 24.8 kg. of ethylene dichloride through the pipe 21 consisting of 18.6 kg. produced in the second reaction tube 16, and 6.2 kg. undecomposed in the first reaction tube 3 and condensed in the cooler 7 were mixed and preheated to about 420° C. 13.0 kg. of chlorine was added through the pipe 2 to the gaseous mixture containing ethylene and ethylene dichloride and the resulting gaseous mixture was fed to the first reaction tube, which is used nickel. Its inside diameter is 12 cm. 1 liter of 20–60 mesh sand is put into the first reaction tube for fluid fed with its reaction gas. The first reaction tube was operated at a temperature of 500° C. and under a pressure of 3 atmospheres. The composition of the outlet gas of the first reaction tube was of 16.2 kg. of ethylene, 21.0 kg. of vinyl chloride, 6.2 kg. of ethylene dichloride, 15.3 kg. of hydrogen chloride and a small amount of chlorides. This gas was passed through the cyclone 5 from the pipe 4 so as to be removed a produced carbon. The outlet gas of the cyclone 5 was fed to the cooler 7 through the pipe 6 and therein was cooled to 30° C. so as to be removed the ethylene dichloride and other chlorides and the resulting gas was fed to the vinyl chloride absorbing tower 9 through the pipe 8. The ethylene dichloride was separated in the cooler 7, was then fed to the first reaction tube through the pipe 21 and was thermodecomposed in the first reaction tube. In the vinyl chloride absorbing tower 9, the vinyl chloride, ethylene dichloride and other chlorides in the reaction gas were absorbed with 57 kg. of ethylene dichloride. In both top and bottom of the vinyl chloride absorbing tower, the temperature was 0° C. and the pressure was 3 atmospheres. The ethylene dichloride absorbed vinyl chloride and others and was fed to the vinyl chloride refining tower 11 through pipe 10, 21.0 kg. of vinyl chloride were taken out of the pipe 12 by rectification. The absorbing solution was recirculated to the vinyl chloride absorbing tower through the pipe 13 to absorb vinyl chloride and others. The outlet gas of the vinyl chloride absorbing tower 9 contained 16.2 kg. of ethylene and 15.3 kg. of hydrogen chloride, had 4.7 kg. of oxygen and 42.4 kg. of excess ethylene added thereto through the pipe 14 and said gaseous mixture was introduced into the second reaction tube 16 through the pipe 15. The mol ratio of the ethylene to hydrogen chloride to oxygen was then 10:2:0.7.

In the second reaction tube a catalyst which consists of 25 weight percent of $CuCl_2$-KCl-$ThCl_4$ and 75 weight percent of silica gel. The mol ratio of $CuCl_2$ to KCl to $ThCl_4$ is 3:2:0.5. The catalyst is fluidized with the reaction gas. The second reaction tube is operated at 400° C. and at 2.8 atmospheres. 90% of hydrogen chloride was converted to ethylene dichloride and the rest was a small amount of vinyl chloride, a polychlorinated compound and unreacted hydrogen chloride. The outlet gas of the second reaction tube 16 was composed of 52.7 kg. of ethylene, 18.6 kg. of ethylene dichloride, 3.6 kg. of water and 1.4 kg. of unreacted hydrogen chloride. This gaseous mixture was fed to the cooler 18 through the pipe 17 and was cooled to 30° C. so as to be condensed and separated liquid ethylene dichloride and aqueous solution of hydrogen chloride.

Said mixture was fed to the separator 20 through the pipe 19 and was separated 18.6 kg. of ethylene dichloride layer from aqueous solution of hydrogen chloride there. The ethylene dichloride then fed to the first reaction tube through the pipe 21 so as to be decomposed into vinyl chloride.

The ethylene separated in the cooler 18 was recirculated to the first reaction tube through the pipe 22 for producing vinyl chloride from ethylene and chlorine.

EXAMPLE 2

Figure 2:
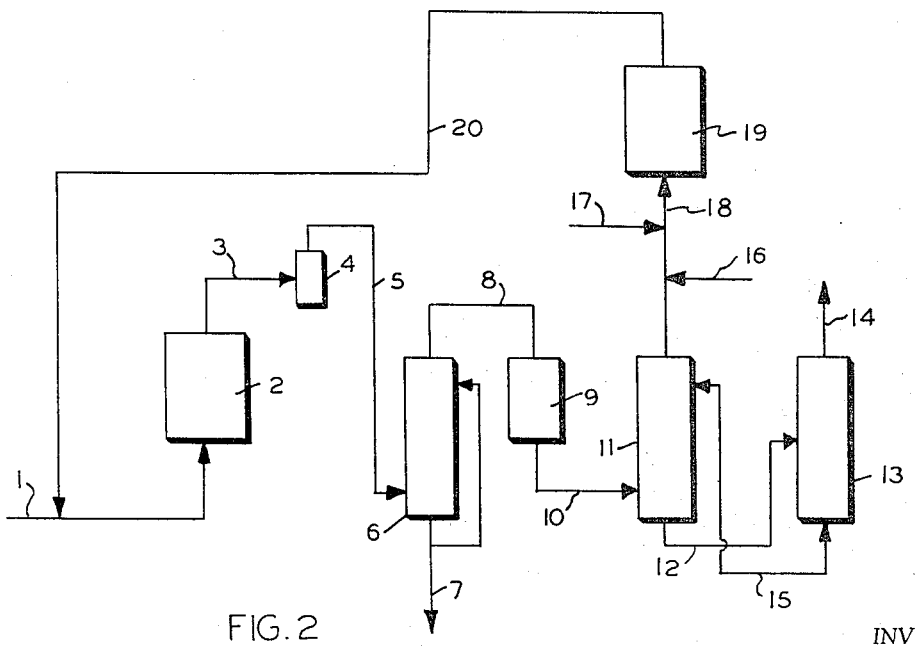

In FIGURE 2, 32.8 kg. of chlorine and the gaseous mixture coming from the second reaction tube 19 were put into the first reaction tube 2 through the pipe 1 and 20, and the one step synthesis of vinyl chloride by the reaction of chlorine and ethylene with each other and the decomposition of ethylene dichloride were carried out simultaneously. The composition of the gaseous mixture entering the first reaction tube from the second reaction tube was of 51.9 kg. of ethylene, 45.3 kg. of ethylene dichloride, 5.5 kg. of water and others. In such case, the mol ratio of the ethylene to chlorine to ethylene dichloride was 4.01:1.00:0.99. The composition of the outlet gas of the first reaction tube was of 41.6 kg. of ethylene, 38.3 kg. of hydrochloric acid, 42.5 kg. of vinyl chloride, 6.5 kg. of ethylene dichloride, 5.5 kg. of water and others. For the conditions of the operation of the first reaction tube, the pressure was 3 atmospheres, the temperature was 480° C., sand was used for the heat carrier and a fluid state was kept as Example 1. The outlet gas of the first reaction tube 2 was passed through the cyclone 4 from the pipe 3 so as to be removed the carbon produced in the first reaction tube. Thereafter the outlet gas of the cyclone 4 was fed to the washing tower 6 through the pipe 5 so as to be washed with ethylene dichloride and simultaneously cooled to a temperature of 150° C. The gas washed and cooled in the washing tower 6 was fed to the dehumidifying tower 9 through the pipe 8 and was completely dehumidified there. Then the dehumidified gas was supplied to vinyl chloride absorbing tower 11 and therein vinyl chloride and other chlorine compounds were absorbed by using ethylene dichloride. The vinyl chloride absorbing tower was operated at a temperature of 0° C. and under a pressure of 3 atmospheres. The outlet gas of the absorbing tower was composed of 41.6 kg. of ethylene and 36.8 kg. of hydrochloric acid, had 26.5 kg. of ethylene and 9.5 kg. of oxygen added thereto through the pipe 16 and 17 and was put into the second reaction tube 19 through the pipe 18. The mol ratio of the ethylene to hydrochloric acid to oxygen was 2.41:1:0.29.

For the second reaction tube, the same catalyst of $CuCl_2$-$KCl$-$ThCl_4$ as Example 1 was used, the temperature was 400° C., the pressure was 2.8 atmospheres and a fluid state was kept. The outlet gas of the second reaction tube 19 having the above-mentioned composition was circulated as it was to the first reaction tube through the pipe 20. The outlet solution of the vinyl chloride absorbing tower 11 was fed to the vinyl chloride refining tower 13 through the pipe 12. 42.5 kg. of vinyl chloride as a product were taken out from the pipe 14 which was the top part of said refining tower. The absorbing solution was recirculated to the vinyl absorbing tower 11 through the pipe 15.

What is claimed is:

1. The process for producing vinyl chloride by the simultaneous chlorine substitution of ethylene and thermodecomposition of ethylene dichloride comprising the steps (1) introducing a gaseous mixture containing ethylene, chlorine and ethylene dichloride to a first reaction zone at a mol ratio of ethylene to chlorine to ethylene dichloride of 3–5:1:0.2–2.0, (2) subjecting said gaseous mixture to simultaneous chlorine substitution of ethylene and thermodecomposition of said ethylene dichloride at a reaction temperature of 450° C. to 550° C. and a contact time of 0.05 to 0.5 second in a fluidized bed in the first reaction zone thereby forming a product containing vinyl chloride, hydrogen chloride and unreacted ethylene, said fluidized bed comprising a heat carrier selected from the group consisting of sand, silicon carbide, glass powder, pumice stone, fire brick, active carbon, silica gel and alumina fluidized by said gaseous mixture, (3) absorbing vinyl chloride from said product with a solvent solution in an absorbing zone, (4) mixing oxygen and ethylene with the outlet gas of the absorbing zone containing hydrogen chloride and unreacted ethylene, (5) subjecting a gaseous mixture from the Step 4 to a catalytic oxychlorination in a second reaction zone to form a product containing ethylene dichloride, vinyl chloride, chlorinated by-product, unreacted hydrogen chloride, water and unreacted ethylene and (6) circulating said product to the first reaction zone whereby ethylene dichloride is decomposed into vinyl chloride simultaneously with a production of vinyl chloride from ethylene and chlorine.

2. The process claimed in claim 1 wherein after the product of the Step 5 is cooled for a condensation to separate liquid ethylene dichloride, chlorinated by-product and water from gaseous vinyl chloride and ethylene, the ethylene dichloride, and chlorinated by-product having been separated from water is circulated to the first reaction zone and further the ethylene having been separated from vinyl chloride is used for producing vinyl chloride.

3. The process claimed in claim 2 wherein ethylene dichloride and ethylene preheated to a temperature of 300–500° C. are fed to the first reaction zone.

4. The process claimed in claim 1 wherein the solvent solution in the absorbing zone is ethylene dichloride, and the absorbing zone is operated at a temperature of 10 to −10° C. and at a pressure of normal pressure to 10 atmospheres.

5. The process claimed in claim 1 wherein the second reaction zone is operated at a reaction mol ratio of ethylene to hydrogen chloride to oxygen of 1.5–6.0:1.0:0.2–0.5, at a reaction temperature of 350–480° C. and at a reaction pressure of normal pressure to 10 atmospheres.

6. The process claimed in claim 1 wherein a catalyst in the second reaction zone is a $CuCl_2$-$KCl$ catalyst to which a promoter selected from the group consisting of $ThCl_4$ and $SnCl_2$ is added.

7. The process claimed in claim 6 wherein a mol ratio of $CuCl_2$ to $KCl$ is 2–0.5:1 and the mol ratio of $CuCl_2$ to said promoter is 1:0.1–0.5.

References Cited by the Examiner

UNITED STATES PATENTS

| 2,204,172 | 6/1940 | Balcar | 260—659 |
|---|---|---|---|
| 2,308,489 | 1/1943 | Cass | 260—656 |
| 2,334,033 | 10/1943 | Riblett | 260—659 |
| 2,374,237 | 4/1945 | Stanley et al. | 260—656 |
| 2,399,488 | 4/1946 | Hearne | 260—659 |
| 2,674,633 | 6/1954 | Reitlinger | 260—659 |
| 2,746,844 | 5/1956 | Johnson et al. | 260—659 |
| 2,838,577 | 6/1958 | Cook et al. | 260—656 |

FOREIGN PATENTS

| 695,297 | 9/1964 | Canada. |
|---|---|---|
| 1,290,062 | 2/1962 | France. |
| 603,809 | 6/1948 | Great Britain. |

LEON ZITVER, *Primary Examiner.*

K. V. ROCKEY, *Assistant Examiner.*